United States Patent
Tang et al.

(10) Patent No.: US 6,795,579 B2
(45) Date of Patent: *Sep. 21, 2004

(54) METHOD AND APPARATUS FOR RECOGNIZING HANDWRITTEN CHINESE CHARACTERS

(75) Inventors: Donald T. Tang, Beijing (CN); Hui Su, Beijing (CN); Qian Ying Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/099,714

(22) Filed: Mar. 14, 2002

(65) Prior Publication Data

US 2002/0168107 A1 Nov. 14, 2002

Related U.S. Application Data

(63) Continuation of application No. 09/287,511, filed on Apr. 7, 1999, now abandoned.

(51) Int. Cl.[7] ................................................ G06K 9/18
(52) U.S. Cl. ...................... 382/185; 341/28; 345/17; 382/186; 382/188; 382/189; 382/198; 382/202; 382/203; 382/314
(58) Field of Search ................................ 382/185–189, 382/198, 202–203, 314; 704/231, 251, 254; 341/22, 28; 345/17

(56) References Cited

U.S. PATENT DOCUMENTS

| | | | |
|---|---|---|---|
| 4,365,235 A | | 12/1982 | Greanias et al. |
| 4,684,926 A | * | 8/1987 | Yong-Min ..................... 340/28 |
| 5,119,296 A | * | 6/1992 | Zheng et al. ............... 707/535 |
| 5,187,480 A | * | 2/1993 | Thomas et al. ................ 341/22 |
| 5,212,769 A | | 5/1993 | Pong |
| 5,438,631 A | | 8/1995 | Dai |
| 5,828,783 A | * | 10/1998 | Ishigaki ....................... 382/186 |
| 5,923,788 A | * | 7/1999 | Chen et al. .................. 382/185 |
| 6,035,063 A | * | 3/2000 | Nakashima et al. ......... 382/187 |
| 6,052,482 A | * | 4/2000 | Arai et al. ................... 382/187 |
| 6,188,789 B1 | * | 2/2001 | Marianetti, II et al. ..... 382/189 |
| 6,275,611 B1 | * | 8/2001 | Parthasarathy .............. 382/187 |
| 6,513,005 B1 | * | 1/2003 | Qin et al. .................... 704/254 |

FOREIGN PATENT DOCUMENTS

| | | |
|---|---|---|
| JP | 52-120726 | 10/1977 |
| JP | 60-8991 A | 1/1985 |
| JP | 60-65385 A | 4/1985 |
| JP | 60-254388 A | 12/1985 |
| JP | 63-36389 A | 2/1988 |
| JP | 1-253079 A | 10/1989 |
| JP | 2-156388 A | 6/1990 |
| JP | 3-123989 A | 5/1991 |
| JP | 07044656 A | 2/1995 |
| JP | 07146918 A | 6/1995 |
| JP | 08077296 A | 3/1996 |
| JP | 09190499 A | 7/1997 |
| JP | 10021341 A | 1/1998 |

* cited by examiner

Primary Examiner—Timothy M. Johnson
Assistant Examiner—Gregory Desire
(74) Attorney, Agent, or Firm—Thu Ann Dang (57) ABSTRACT

A method for recognizing handwritten Chinese characters based on stroke recognition comprises steps of: recognizing handwritten strokes, updating stroke code sequences; retrieving in dictionaries/lexicons at least one corresponding character/phrase entry so as to obtain at least one candidate Chinese character/phrase; dynamically displaying the at least one candidate Chinese character/phrase; jumping to the step of recognizing strokes if it is judged that a next stroke is being written; inputting a displayed Chinese character/phrase into computers as the result of recognition if this character/phase is selected by the user.

32 Claims, 9 Drawing Sheets

| ALPHABET | STROKE | ALPHABET | STROKE |
|---|---|---|---|
| A | ∧ | N | N |
| B | B B | O | O O |
| C | C | P | P P |
| D | D P | Q | O |
| E | E | R | R R |
| F | Γ Γ | S | S |
| G | G 6 | T | ⊐ |
| H | h | U | U |
| I | i | V | V V |
| J | J | W | W |
| K | ⋋ | X | X ∞ |
| L | L | Y | Y Y |
| M | m m | Z | Z |

| SPACE | •— | BACKSPACE | —• |
| CARRIAGE RETURN/ LINE FEED | ╱ | PERIOD | TOUCH TWICE |

| STROKE | STROKE CODE | GRAFFITI RECOGNITION RESULT |
|---|---|---|
| — | 1 | SPACE |
| ╱ | 2 | MENU COMMANDS |
| │ | 3 | i |
| ╱ ╱ | 4, 5 | j CARRIAGE RETURN |
| ╲ ╲ | 6, 7 | EXTENDED SHIFT, PUNCTUATION SHIFT |
| ⌐ | 8 | t |
| ⌐ | 9 | t |
| ⌐ ( ) ) | 10 | t, o, y |
| ↳ | 11 | s, y |
| ↳ | 12 | s |
| ⌐ | 13 | b |
| 3 | 14 | b |
| ⌐ | 15 | j, v |
| L L (↙) | 16, 17 | l, u |
| L | 18 | u |
| Z | 19 | u, z, y, e |
| < | 20 | c |
| ↶ | 21 | z, u, l, y |
| < | 22 | l, e, c |
| ↶ | 23 | z, u |

FIG. 8

| GRAFFITI RECOGNITION RESULT | STROKE CODE | STROKE |
|---|---|---|
| SPACE | 1 | — |
| MENU COMMANDS | 2 | ╱ |
| i | 3 | │ |
| j | 4, 5, 15 | ╱ ╱ ↓ |
| CARRIAGE RETURN | 4, 5 | ╱ ╱ |
| EXTENDED SHIFT | 6, 7 | ╲ ╲ |
| PUNCTUATION SHIFT | 6 | ╲ |
| b | 13, 14 | ⌐ ⌐ |
| l | 16, 17, 21, 22 | L < ㄥ < L (↙) |
| c | 20, 22 | < ㄥ |
| z | 19, 21, 23 | ㄥ ㄥ ㄥ |
| v | 15 | ↓ |
| e | 19, 22 | ㄥ < |
| o | 10 | ⌐ ( ) ) |
| t | 8, 9, 10 | ⌐ ⌐ ⌐ ( ) ) |
| s | 11, 12 | ゟ ゟ |
| u | 16, 17, 18, 19, 21, 23 | L L (↙) L ㄥ ㄥ ㄥ |
| y | 11, 10, 21 | ゟ ⌐ ( ) ) ㄥ |

FIG. 9

| HANDWRITTEN STROKE | GRAFFITI RECOGNITION RESULT | STROKE CODE SEQUENCE | CANDIDATE CHINESE CHARACTERS OF EACH SEQUENCE | DISPLAYED CHINESE CHARACTERS |
|---|---|---|---|---|
| ∣ | i | 3 | 卜中口门... | 卜中口门上冈见内... |
| ⏋ | t | 3,8<br>3,9<br>3,10 | 口见日...<br>冗写军...<br>中冈... | 中口冗区见写内日... |
| — | SPACE | 3,8,1<br>3,9,1<br>3,10,1 | 口日日...<br>写军冠...<br>同 | 同口写日军日冠中... |
| — | SPACE | 3,8,1,1<br>3,9,1,1 | 口日日...<br>冠 | 口冠日日中旦圭叮... |
| ·∣ | i | 3,8,1,1,3 | 甲申叶... | 甲申叶吐吓吱昌国... |
| — | SPACE | 3,8,1,1,3,1 | 吐国哇 | 吐国哇 |
| ╲ | PUNCTUATION SHIFT | 3,8,1,1,3,1,6 | 国 | 国 |
| — | SPACE | 3,8,1,1,3,1,6,1 | 国 | 国 |

FIG. 10

| PINYIN AND STROKE INPUT | DISPLAYED CANDIDATE CHINESE CHARACTERS |
|---|---|
| g | 干个工弓广古瓜归... |
| ∣ | 归国冈刚岗国果购... |

FIG. 11A

| PINYIN AND STROKE INPUT | DISPLAYED CANDIDATE CHINESE CHARACTERS |
|---|---|
| g | 干 个 工 弓 广 古 瓜 归 ... |
| gz | 各种 工作 改造 改正 规则 ... |
| 丨 | 贵州 贵重 固执 果子 跟着 ... |

FIG. 11B

| PINYIN AND STROKE INPUT | DISPLAYED CANDIDATE CHINESE CHARACTERS |
|---|---|
| gui z | 规则 贵州 鬼子 柜子 贵重 ... |
| \ | 诡诈 |

FIG. 12

METHOD AND APPARATUS FOR RECOGNIZING HANDWRITTEN CHINESE CHARACTERS

CROSS-REFERENCE TO RELATED APPLICATIONS

This application is a continuation of U.S. application Ser. No. 09/287,511, filed Apr. 7, 1999, now abandoned which is hereby incorporated herein by reference.

FIELD OF THE INVENTION

The present invention relates to methods and apparatus for recognizing handwritten Chinese characters, and in particular to methods and apparatus for recognizing handwritten Chinese characters based on combinations of phonetic letter and stroke recognition.

BACKGROUND OF THE INVENTION

Nowadays there exist various keyboard-based methods for inputting Chinese characters and various methods for recognizing handwritten Chinese characters. Among them the keyboard-based inputting methods (such as five-stroke method) generally need better training of the users so that the users can remember the character codes defined by means of phones, shapes and meanings of the characters for mapping them to the keyboard, so the methods cannot be easily used. The processes of recognizing handwritten Chinese characters usually comprise feature extraction, stroke recognition, sorting and other time-consuming and memory-consuming tasks. These handwritten recognition processes are able to recognize a Chinese character only after the user has finished writing all the strokes, and demand more system resources. Though these handwriting inputting methods can be employed on PC's, it is not so easy to use these methods on computers having limited amount of resources, such as palm computers, electronic-notebooks, and personal digital assistants, because in such kinds of computers the CPU speed is rather low and the memory size is extremely limited. Furthermore, the recognition rate of handwritten Chinese characters is rather low, demanding much time in correcting the errors.

SUMMARY OF THE INVENTION

The first object of the present invention is to provide a method for recognizing handwritten Chinese characters based on stroke recognition.

The second object of the present invention is to provide a method for recognizing handwritten Chinese characters based on combination of stroke recognition and phonetic letter recognition.

The third object of the present invention is to provide an apparatus for recognizing handwritten Chinese characters based on stroke recognition.

The fourth object of the present invention is to provide an apparatus for recognizing handwritten Chinese characters based on combination of stroke recognition and phonetic letter recognition.

To accomplish the first object, the present invention provides a method for recognizing handwritten Chinese characters, characterized by comprising the following steps: a step of recognizing strokes, detecting the movement of a pen between pressing down and lifting up of the pen when a user uses the pen to write in strokes a Chinese character/phrase, identifying the pen movement with at least one stroke code, and forming at least one new stroke code sequence respectively with each one of the at least one stroke code and previously formed stroke code sequences; a step of retrieving in dictionaries/lexicons stored in a computer memory at least one dictionary/lexicon entry which corresponds to the at least one new stroke code sequence formed in the step of recognizing strokes, so as to obtain at least one candidate Chinese character/phrase; a step of dynamically displaying the at least one candidate Chinese character/phrase at the same time when the user writes the strokes; a step of jumping to the above-mentioned step of recognizing strokes when it is judged that the user goes on writing the next stroke; a step of generating recognition results, in which if it is judged that the user has selected one of the at least one candidate character/phrase, regarding the selected Chinese character/phrase as a recognition result of the handwritten Chinese characters/phrases.

To accomplish the second object, the invention provides a method for recognizing handwritten Chinese characters, characterized by comprising the following steps: a step of recognizing phonetic tags, detecting the handwritten phonetic tags of the Chinese character/phrase and determining a range of entries in the dictionaries/lexicons based on the phonetic tag; a step of recognizing strokes, detecting the pen movement between pressing down and lifting up of the pen when the user uses the pen to write in strokes a Chinese character/phrase, identifying the pen movement with at least one stroke code, and forming at least one new stroke code sequence respectively with each one of the at least one stroke code and previously formed stroke code sequences; a step of retrieving in the range determined in the above step of recognizing phonetic tags at least one character/phrase entry which corresponds to the at least one new stroke code sequence formed in the step of recognizing strokes, so as to obtain at least one candidate Chinese character/phrase; a step of dynamically displaying the at least one candidate Chinese character/phrase; a step of jumping to the above-mentioned step of recognizing strokes when it is judged that the user goes on writing the next stroke; a step of generating a recognition result, in which if it is judged that the user has selected one of the at least one candidate character/phrase, regarding the selected Chinese character/phrase as a result of recognition of the handwritten Chinese characters/phrases.

To accomplish the third object, the present invention provides an apparatus for recognizing handwritten Chinese characters, characterized by comprising: means for recognizing strokes, detecting a pen movement between pressing down and lifting up of the pen when a user uses the pen to write in strokes a Chinese character/phrase, identifying the pen movement with at least one stroke code, and forming at least one new stroke code sequence respectively with each one of the at least one stroke code and previously formed stroke code sequence; means for retrieving in dictionaries/lexicons stored in a computer memory at least one character/phrase entry which corresponds to the at least one new stroke code sequence, so as to obtain at least one candidate Chinese character/phrase; means for dynamically displaying the at least one candidate Chinese character/phrase; means for generating a recognition result, based on the displayed at least one candidate character/phrase selected by the user, regarding the selected Chinese character/phrase as a result of recognition of the handwritten Chinese characters/phrases.

To accomplish the fourth object, the present invention provides an apparatus for recognizing handwritten Chinese characters, characterized by comprising: means for recognizing phonetic tags, detecting the handwritten phonetic tags of the Chinese character/phrase and determining a range of entries in the dictionaries/lexicons stored in a computer memory based on the phonetic tags; means for recognizing strokes, detecting a pen movement between pressing down and lifting up of the pen when a user uses the pen to write in strokes a Chinese character/phrase, identifying the pen movement with at least one stroke code, and forming at least one new stroke code sequence respectively with each one of the at least one stroke code and previously formed stroke code sequence; means for retrieving in the range determined by the means for recognizing phonetic tags at least one character/phrase entry which corresponds to the at least one new stroke code sequence, so to obtain at least one candidate Chinese character/phrase; means for dynamically displaying the at least one candidate Chinese character/phrase; means for generating a recognition result, based on the displayed at least one candidate character/phrase selected by the user, regarding the selected Chinese character/phrase as a result of recognition of the handwritten Chinese character/phrases.

The methods of the invention make use of the feature of handwriting of the Chinese characters, i.e. stroke by stroke. The recognition rate of such recognizing methods are limited in two aspects: the rate of stroke recognition and the number of strokes in handwriting of a character.

As the object set to be recognized in the invention includes only strokes of Chinese characters (about several tens of strokes), which are much less than the total number of Chinese characters, it is possible to specially design methods for recognizing strokes by using limited amount of resources, so that there will be much higher probability that correct results of stroke recognition will be among the candidate strokes, thereby having relatively high stroke recognition rate (e.g. by using the features of direction of pen movement and change of the direction with time to recognize the strokes). At the same time, man-machine interactive inputting method allows the users to easily correct the recognizing errors of the just input strokes. Besides, the methods of the invention display the candidate Chinese characters/phrases on-line, so the users are able to input the handwritten Chinese character without the need of finishing writing all the strokes of the Chinese character. The methods of the invention take account of these two factors of higher recognizing rate of strokes and smaller number of strokes, thereby having higher recognition rate.

The second method of the invention makes use of the popular Chinese character Pinyin system to make the range of retrieving stroke code sequences smaller. Firstly, as the number of Pinyin alphabets is rather limited, rather high recognizing rate can be attained by using specified methods but using only limited amount of resources. Meanwhile, as the number of Chinese characters having the same first Pinyin alphabet is small, far less than the total amount of Chinese characters (it has been estimated that the maximum number of Chinese characters having the same first Pinyin alphabet is no more than 400), the retrieving range can be greatly reduced so as to remarkably raise the recognition rate of the methods of the invention. The number of strokes handwritten by the users is small, so the speed of inputting is higher and the methods can be easily employed.

The methods of the invention can be easily used to input handwritten Chinese characters to the computers with limited resources, such as palm computers, electronic notebooks and personal digital assistants.

BRIEF DESCRIPTION OF THE DRAWINGS

The above and other features and advantages of the invention will become more apparent from the following detailed description of the preferred embodiments with reference to the accompanying drawings.

In the following the preferred embodiments will be described in details with reference to the accompanying drawings.

DETAILED DESCRIPTION OF THE PREFERRED EMBODIMENTS

Figure 1:
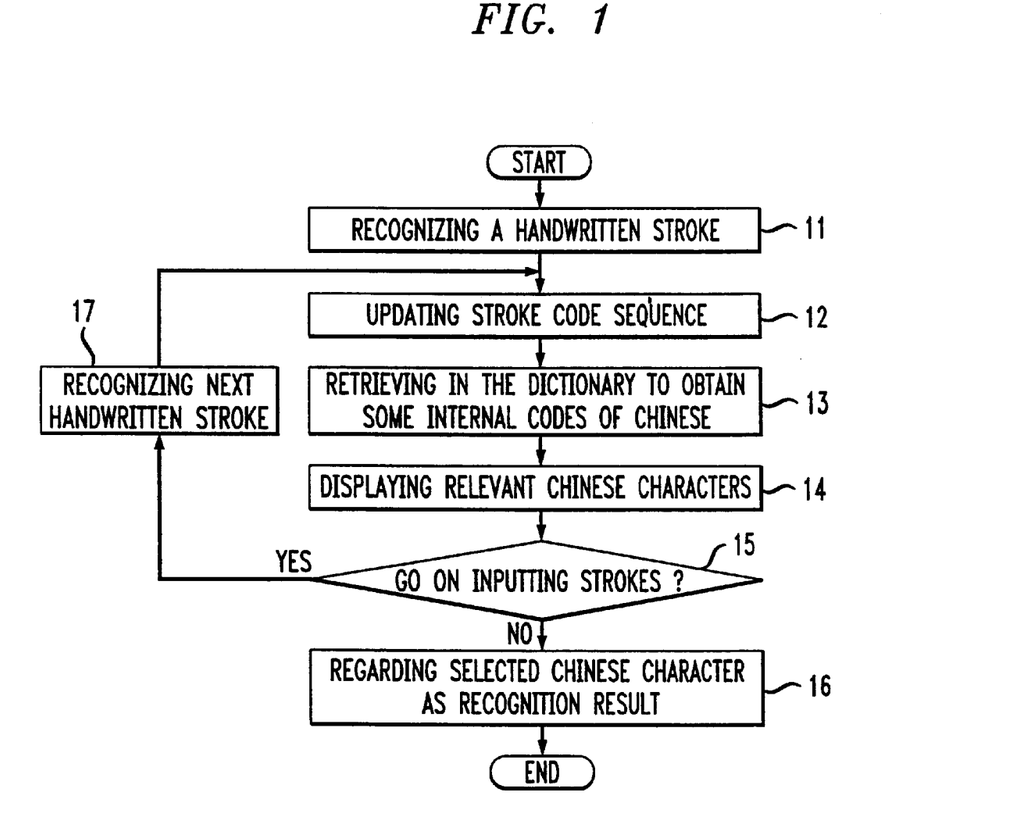
FIG. 1 is the flow chart of the first embodiment of the invention.

FIG. 1 shows the flow chart of the first embodiment of the invention, By using this method, the user uses a pen to write a Chinese character on the handwriting recognition apparatus according to traditional stroke sequence or his/her customary stroke sequence to input a Chinese character.

The method shown in FIG. 1 works as follows. Step 11 recognizes a stroke written by the user on the handwriting recognition apparatus and identifies the pen movement with at least one stroke code. Step 12 updates the stroke code sequence with the identified stroke code. Stroke code sequence consists of the current stroke and previously handwritten strokes prior to the current stroke. Step 13 uses the updated stroke code sequence to retrieve in the dictionaries stored in the computer memory a dictionary entry of stroke code sequence which corresponds to the updated stroke code sequence, so as to obtain Chinese character internal code from the retrieved dictionary entry.

It is noted that step 13 will retrieve more than one dictionary entry, i.e. more than one Chinese character internal code when not all strokes of Chinese character have been written or when some Chinese characters have the same strokes and stroke sequence. Furthermore, in the dictionaries there are at least one dictionary entry for each Chinese character. The internal codes of Chinese characters and the stroke code sequences of the strokes of these corresponding handwritten Chinese characters are stored in the dictionary entries. To meet the requirements of writing styles of different users, more than one stroke code sequence and hence more than one dictionary entry may be set for each of some Chinese characters. The dictionary entries may also include other contents and the dictionaries can be implemented in various ways (such as databases). All these set no limitations on the present invention.

It is to be noted that there are many methods for retrieving the corresponding dictionary entries in step 13.

The first retrieving method retrieves the dictionary entries containing the recognized stroke code sequences. Assuming that the current stroke code sequence length is N, i.e. N strokes have been written, then step 13 retrieves in the dictionary the sequence consisting of previous N stroke codes and those dictionary entries in which the stroke code sequences are identical to current stroke code sequence, and then takes the relevant Chinese character as a candidate Chinese character.

The second retrieving method retrieves the stroke codes containing the same categories of the recognized stroke code sequences and the dictionary entries in which the number of appearance of each stroke code is identical to that in the recognize stroke code sequence. In such a way, it is possible to recognize those Chinese characters having correct strokes but wrong writing sequence. Assuming that there are totally I strokes for all the characters, when the user writes a Chinese character, the number of strokes of each category is counted and the numbers of the strokes of all the categories are expressed as X=[x1, x2 ... xi, ... xI](i=1,2, ... ,I). The number of strokes of each category contained in the corresponding Chinese character is computed for each of all the total J entries in the dictionary, expressed as Sj=[sj1, sj2, ... , sji, ... , sjI](J=1, ... ,J). Hence, if step 13 judges that X=Sj, then the j-th dictionary entry is retrieved and the corresponding Chinese character is taken as a candidate Chinese character.

For example, the dictionary entry of the Chinese character "生" is assumed to be the K-th entry in the dictionary, in which the stroke code sequence is "5,1,1,3,1"(refer to the table of stroke codes listed in FIG. 7), then Sk1=3, Sk3=1, Sk5=1. If the user writes the Chinese character "生" with the stroke sequence of "5, 1, 3, 1, 1", then x1=3, x3=1, x5=1. In this case X=S, the k-th dictionary entry is retrieved and its corresponding "生" becomes a candidate Chinese character.

The third method retrieves the dictionary entry which meets the following requirements: the sum of the differences between the numbers of appearances of various stroke codes contained in the dictionary entry and that contained in the recognized stroke code sequence is less than a predetermined threshold. This is the case allowing the users make individual mistakes during his/her writing of Chinese characters. This condition of retrieving can be expressed as:

$$\sum_{i=1}^{I}(xi-sji) \le \theta, \theta \text{是一个阈值}$$

where θ is a threshold representing an allowable number of mistaken strokes. θ=1 means that one mistaken stroke is allowed. θ=0 means that no mistaken stroke is allowed, in which case this method is the same as the first method.

Figure 7:
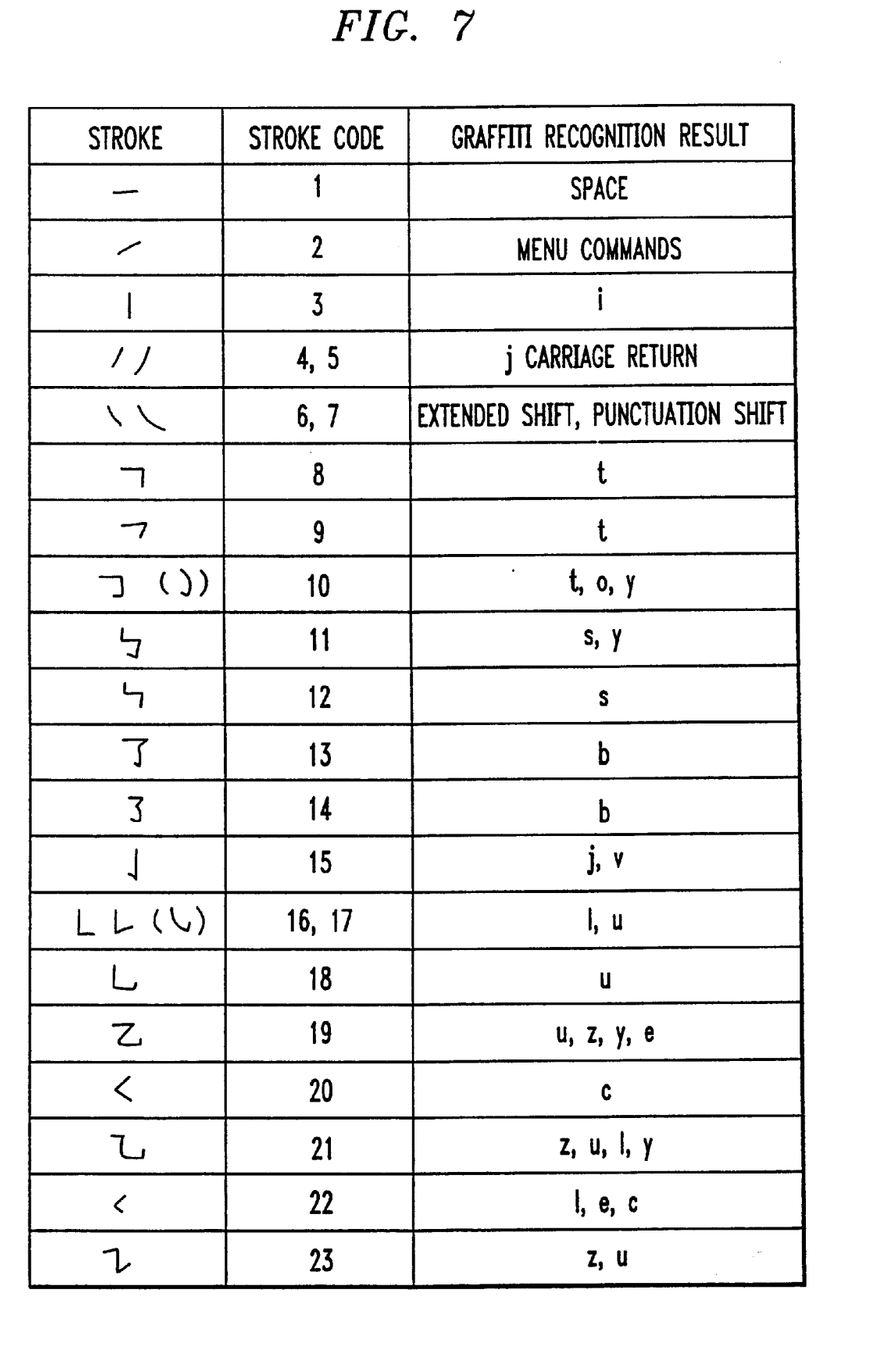
FIG. 7 is the correspondence table between the frequently used Chinese character strokes and graffiti alphabets or special symbols.

For example, the correct stroke code sequence of the Chinese character "手" is "5, 1, 1, 15"(refer to the table of stroke codes listed in FIG. 7). If the user mistakenly write a horizontal line instead of a correct left slanting stroke, i.e. if he writes an incorrect stroke and gets an incorrect stroke sequence, the resulting stroke code sequence will be "1, 1, 1, 15", then $$\sum_{i=1}^{I}(xi-sji)=1$$

Now if the threshold value θ=1, though the user mistakenly writes one stroke, step 13 is still able to retrieve the dictionary entry corresponding to "手", and takes "手" as a candidate Chinese character.

It is possible to use the above three retrieving methods to dynamically modify the respective stroke code sequence of the dictionary entry based on the user's customary writing. For example, in the above example, though "1, 1, 1, 15" is the mistaken stroke code sequence, but it matches user's customary writing, so a dictionary entry corresponding to "手" and containing the stroke code sequence "1, 1, 1, 15" may be added to the dictionary, or the original stroke code sequence in the dictionary entry corresponding to "高" may be changed to "1, 1, 1, 15".

Step 14 uses the obtained Chinese character internal code to display the respective Chinese character. Step 15 judges if the user goes on writing the next stroke of the written Chinese character. Related to this step, the user checks the displayed candidate Chinese character to see if the written Chinese character is being displayed. If the user notes that the written Chinese character is not being displayed, he/she goes on writing the next stroke.

If the judgement result in step 15 is "Yes", the process proceeds to step 17. Step 17 is similar to step 11, with the only difference in that the next user written stroke is detected. If the judgement result in step 15 is "No", step 16 inputs into a computer or other apparatuses the Chinese character which the user has selected from the displayed Chinese characters as a result.

Due to the limitation of the displaying area on the screen, step 13 may only obtain limited number of the internal codes which is not more than a predetermined value. The number of the Chinese character internal codes obtained in step 13 decreases with the increase of number of user handwritten strokes. When step 14 displays the Chinese character being written by the user, the user may select that character as an input in many ways (such as by point-touching that character). In most cases, that Chinese character appears on the screen before the user necessarily finishes writing all the strokes of that Chinese character. In such a way, the input time for handwriting is remarkably reduced and the requirements to the system resources is significantly reduced.

Figure 2:
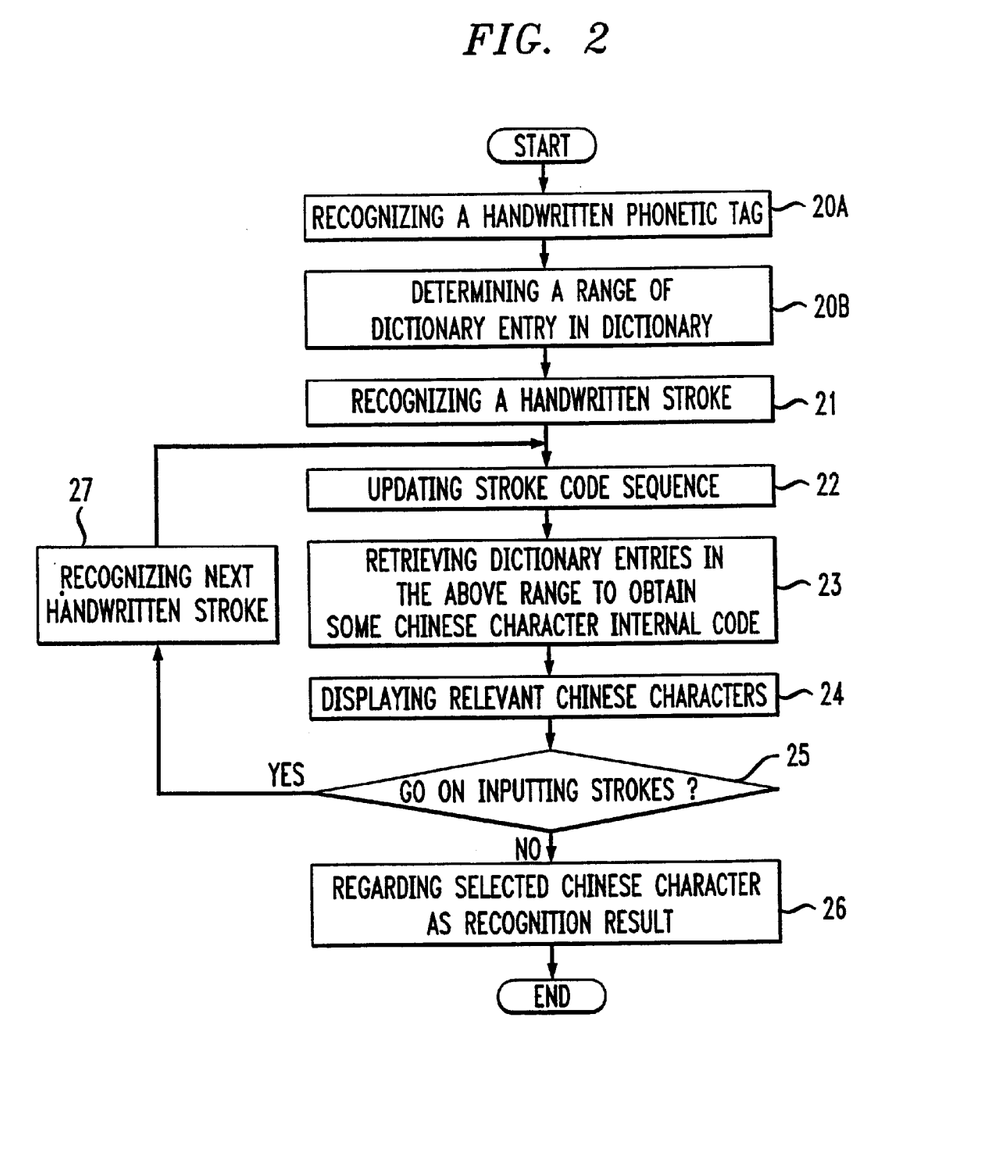
FIG. 2 is the flow chart of the second embodiment of the invention.

FIG. 2 shows the flow chart of the second embodiment of the invention. When a user uses this method to input a Chinese character, he/she firstly uses a pen to write a phonetic tag of the Chinese character, such as the first alphabet of Chinese Pinyin of a Chinese character, on the handwritten character recognition apparatus; and then writes that Chinese character on the handwritten character recognition apparatus with traditional stroke sequence or his/her customary stroke sequence. Using the first alphabet of Chinese Pinyin has the advantage of preventing the user from confusing phonemes with similar ones in spelling, such as "z" with "zh", "s" with "sh", "c" with "ch", "in" with "ing", "en" with "eng" and so on. Naturally, the requirement of inputting the first alphabet does not put any limitations on the invention. Here the only requirement is that the handwritten character recognition apparatus can recognize both Pinyin alphabet and Chinese character stroke. Alternatively, separate alphabet recognition and stroke recognition apparatuses may be used.

The method shown in FIG. 2 works as follows. Step 20A recognizes a Pinyin tag written by the user on the handwritten character recognition apparatus. Step 20B determines a range of dictionary entries in the dictionary stored in a computer memory based on the detected Pinyin tag, so that the Pinyin tag of the corresponding Chinese character in the range of dictionary entries is identical to or corresponding to the detected Pinyin tag. Step 21 detects a stroke written by the user on the handwritten character recognition apparatus and identifies the pen movement with at least one stroke code. Step 22 uses the identified stroke code to update the stoke code sequence. The stroke code sequence is formed respectively with current stroke code and the stroke codes of the handwritten strokes previously identified prior to the current stroke. Step 23 uses the updated stroke code sequence to retrieve in the range of dictionary entries determined by step 20B the dictionary entry having a stroke code sequence which corresponds to the updated stroke code sequence, and obtains a Chinese character internal c Je from the retrieved dictionary entry.

It is to be noted that step 23 retrieves more than one dictionary entry and obtains more than one Chinese character internal code before the user finishes writing all the strokes of the Chinese character or when some Chinese characters have the same strokes and stroke sequence. Besides, in the dictionary there are at least one dictionary entry for each Chinese character. The phonetic tag, the internal code and the stroke code sequence for writing the strokes of the relevant Chinese character are stored in the dictionary entry. To meet the requirements of different writing styles of various users, more than one stroke code sequence and hence more than one dictionary entry may be included for some Chinese characters. Other contents may also be included in the dictionary and the dictionary may be implemented in various ways (such as databases). All these make no restrictions on the present invention.

It is noted that there are many methods for retrieving the relevant dictionary entries, whose illustrations are similar to that of step 13 in FIG. 1 and not to be repeated.

Step 24 displays the relevant Chinese character based on the obtained Chinese character internal codes.

Step 25 judges if the user goes on writing the next stroke of the written Chinese character. Related to this step, the user checks the displayed candidate Chinese character to see if the written Chinese character is being displayed. If the user has found that the written Chinese character is not yet displayed, he/she goes on writing the next stroke.

If the judgement result of step 25 is "yes", the process proceeds to step 27. Step 27 is similar to step 21 with the only difference in that the next stroke written by the user is detected. If the judgement result of step 25 is "No", step 26 inputs one Chinese character selected by the user from the displayed Chinese characters into a computer or other apparatuses as a result.

It is understood that steps 20A and 20B are only used to determine the searching range in the dictionary, so it is only necessary to execute those two steps before step 23 but not necessarily at the initial time.

In the method shown in FIG. 1 the retrieving range of step 13 is the whole dictionary. Compared with the method of FIG. 1, in the method of FIG. 2 the retrieving range of step 23 is only the retrieving range determined based on the handwritten Pinyin tag, thereby reducing the number of handwritten strokes, further raising recognition rate and reducing the inputting time.

The above-mentioned two methods can also be used to input Chinese phrases. For this purpose, it is necessary to add a lexicon in the computer memory. In the lexicon there are lexicon entries of every Chinese phrases. A lexicon entry can include the Pinyin tags of relevant phrases (such as the alphabet string composed of the first Pinyin alphabets of each Chinese characters contained in these phrases), the internal code string composed of the internal codes of each included Chinese character and Chinese character stroke code sequences. The lexicon entry can also include other contents and the lexicon can be implemented one way or another (such as databases). In addition, a lexicon does not necessarily include stroke code sequence, and some phrases containing a certain Chinese character can be retrieved from that Chinese character itself based on some correspondence between the dictionary and the lexicon. The storing way of the lexicon and the stored contents of each lexicon entry put no limitations on the present invention.

If it is desirable to input handwritten phrases, in the flow charts shown in FIG. 1 and FIG. 2 the strokes detected in steps 11, 17, 21 and 27 are the handwritten strokes of each Chinese character in the phrase. Steps 13 and 23 are used to retrieve relevant lexicon entries in the lexicons. Steps 14 and 24 are used to display the retrieved phrases, and the phonetic tag recognized in step 20A is the phonetic tag of the phrase.

Furthermore, when the range of the relevant lexicon entries cannot be determined, i.e. when there is no such phrase in the lexicon, the user can determine each Chinese character of that phrase based on the individually input Chinese characters. Hence a step of forming new phrase and adding a new lexicon entry into the lexicon can be added into the above methods.

The third embodiment of the invention will be described below. This embodiment is implemented on the palm computer PalmPilot™ made by the U.S. Robotics Corporation.

Figure 3:
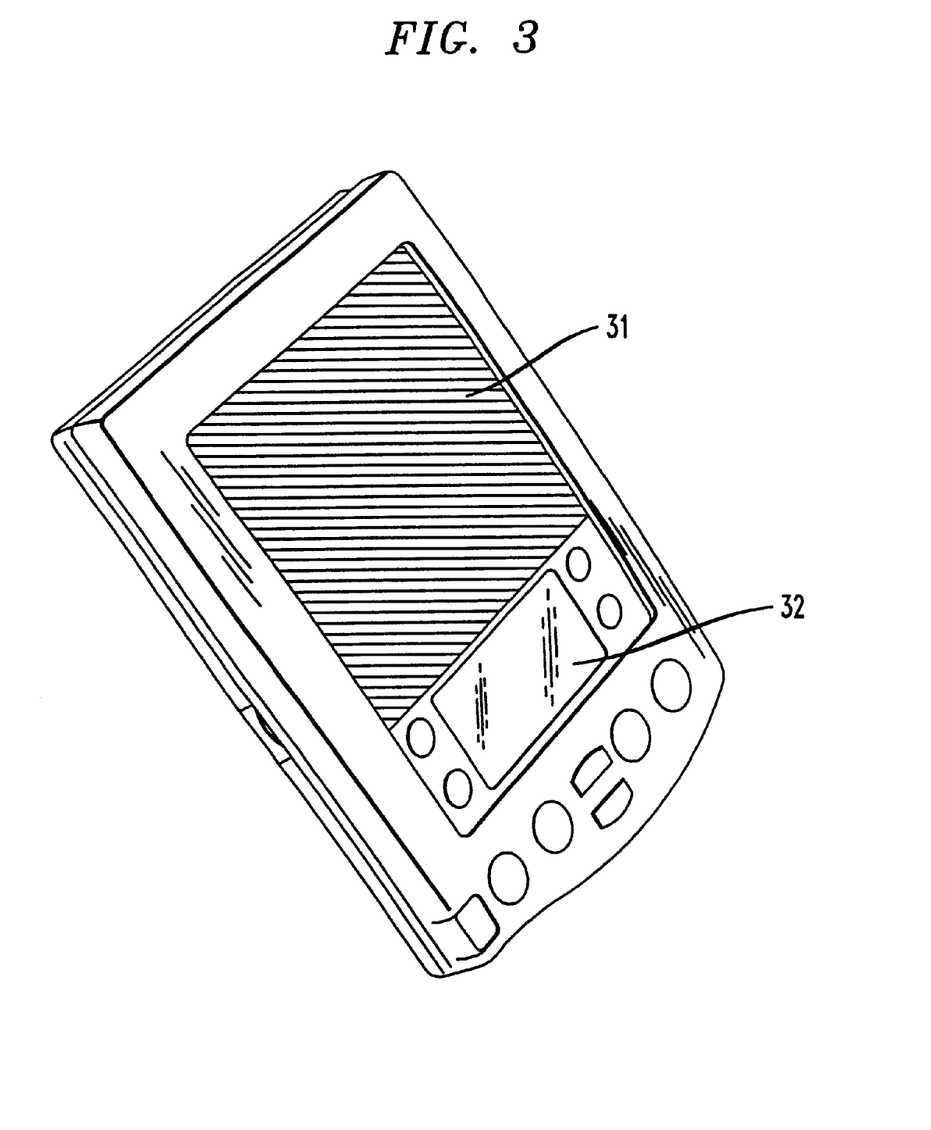
FIG. 3 is the external appearance of a PalmPilot computer.

Firstly, there is a brief description of PalmPilot computer. FIG. 3 shows the external appearance of PalmPilot. Label 31 denotes the displaying screen, label 32 denotes the writing area. This palm computer is mainly used as input system of English texts and digits based on graffiti recognition system (Graffiti). The graffiti recognition system (Graffiti) is a system which is able to quickly recognize simple written strokes such as an alphabet or a digit. When a user writes an English alphabet or a digit on the writing area 32 in specified strokes, the system automatically invokes the graffiti recognition system, which recognizes the strokes written by the user as relevant graffiti alphabets or digits, which in turn are input into PalmPilot. To invoke the graffiti recognition system does not necessarily require that the strokes are written in the writing area 32, so writing in the writing area 32 is of no restriction to the embodiment.

Figure 4:
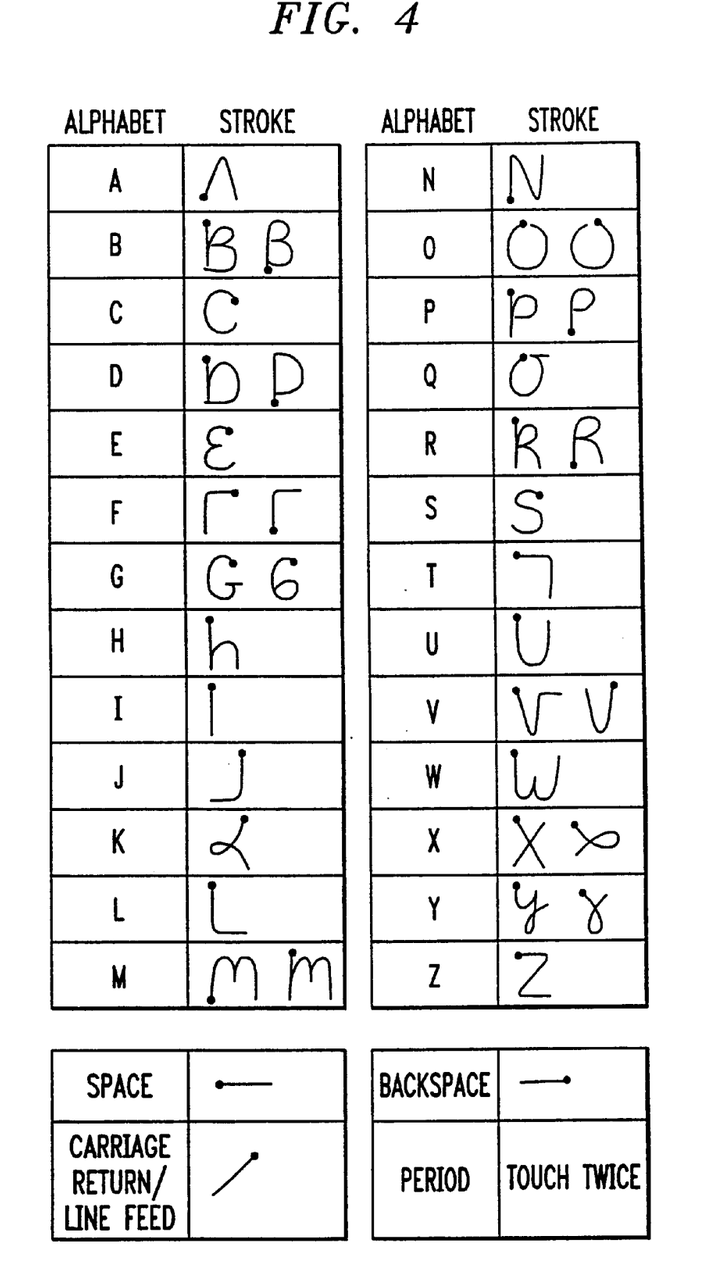
FIG. 4 illustrates the exemplary graffiti alphabets and special symbols which can be recognized by the PalmPilot Graffiti Recognition System.

FIG. 4 shows some strokes and their corresponding recognition results. In the strokes shown in FIG. 4, a dot represents the point of pressing down the pen. For example, when the user presses down the pen on the writing area 32 and then writes a horizontal line to the right, the graffiti recognition system will recognize the pen movement as a "space". As another example, when the user presses down the pen on the writing area 32 and then writes a vertical line downward, the graffiti recognition system will recognize the pen movement as an English alphabet "I". In addition to what are shown in FIG. 4, the grafti recognition system specifies other strokes which correspond to the digits. Here they are not to be exemplified one by one.

In large amount of experiments the inventors have found that when the Chinese characters are written on the writing area 32 of PalmPilot, the graffiti recognition system is able to recognize each of all the written Chinese character stroke as a graffiti alphabet or special symbol. As some different strokes are recognized as the same graffiti alphabet or the same special symbol, the recognized graffiti or special symbol are converted into at least one stroke code.

Steps 11, 17 in the method of FIG. 1 or steps 21, 27 in the method of FIG. 2 can be divided into two steps.

Figure 5:
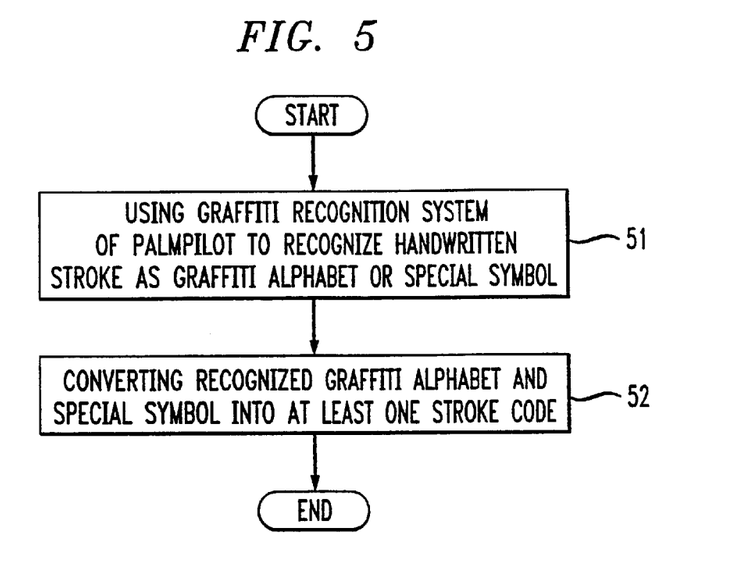
FIG. 5 is the partial flow chart of the third embodiment of the invention.

As shown in FIG. 5, step 51 uses the graffiti recognition system of PalmPilot computer to recognize the handwritten stoke as a graffiti alphabet or a special symbol. Step 52 converts the recognized graffiti alphabet and special symbol into at least one stroke code. During implementation, after the user has handwritten a stroke, the method of the invention gets a message containing the graffiti alphabet or special symbol recognized by the graffiti recognition system from the operating system of PalmPilot and gets the graffiti alphabet or special symbol from the message; then uses the correspondence table between the graffiti alphabets or special symbols and stroke codes (shown in FIG. 8) to convert the above-mentioned graffiti alphabet or special symbol into some stroke codes.

Figure 6:
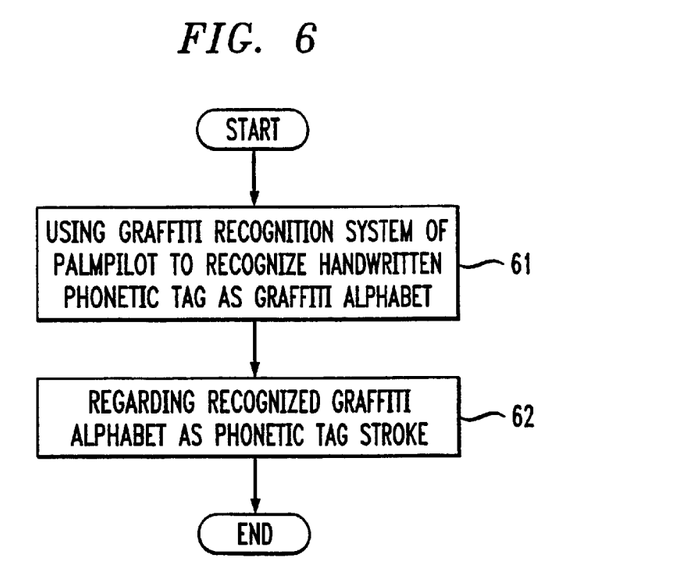
FIG. 6 is the partial flow chart of the third embodiment of the invention.

Step 20A in the method of FIG. 2 can be divided into two steps. As shown in FIG. 6, step 61 uses the graffiti recognition system of PalmPilot computer to recognize the handwritten Pinyin alphabet as a graffiti alphabet. Step 62 uses the recognized graffiti alphabet as a phonetic tag.

In order to calculate the probability of successfully recognizing the Chinese character strokes written on the writing area 32 by the PalmPilot users as a group of corresponding graffiti; alphabets or special symbols, the inventors asked many users to write Chinese character strokes on the writing area 32, collected all the possible recognition results for each category of Chinese character strokes and selected a group of graffiti alphabets or special symbols corresponding to each stroke so that the probability of recognizing a given stroke as its corresponding group of graffiti alphabets or special symbols was larger than 99.5%. These statistical data covered a rather wide area that nearly all the users having different writing styles took part in this experiment, so this 99.5% can be approximately regarded as the recognition rate of the writing of the strokes.

As the reliability of inputting phonetic tag is rather high (due to the fact that Graffiti is specially designed to recognize handwritten alphabets), the number of strokes to be written in the method of combination of phonetic tags and strokes will be even smaller, so the probability of correct inputting will be higher.

FIG. 7 exemplarily shows the correspondence table between 23 most frequently used Chinese character strokes having the above-mentioned good recognition rate and the graffiti recognition results. These 23 strokes are assigned stroke codes 1 to 23 respectively. It is to be understood that the strokes shown in FIG. 7 is only for illustration purpose and do not put an limitation on the invention.

As shown in FIG. 7, the recognition result of stroke 1, i.e. the horizontal line "-", is a "space", the recognition result of stroke 3, i.e. the vertical line "|" is "I". The strokes and the recognition results are not one-to-one correspondent to another. For example, stroke 23 corresponds to two results U and Z, and the recognition results of strokes 8, 9 and 10 may be T.

Figure 8:
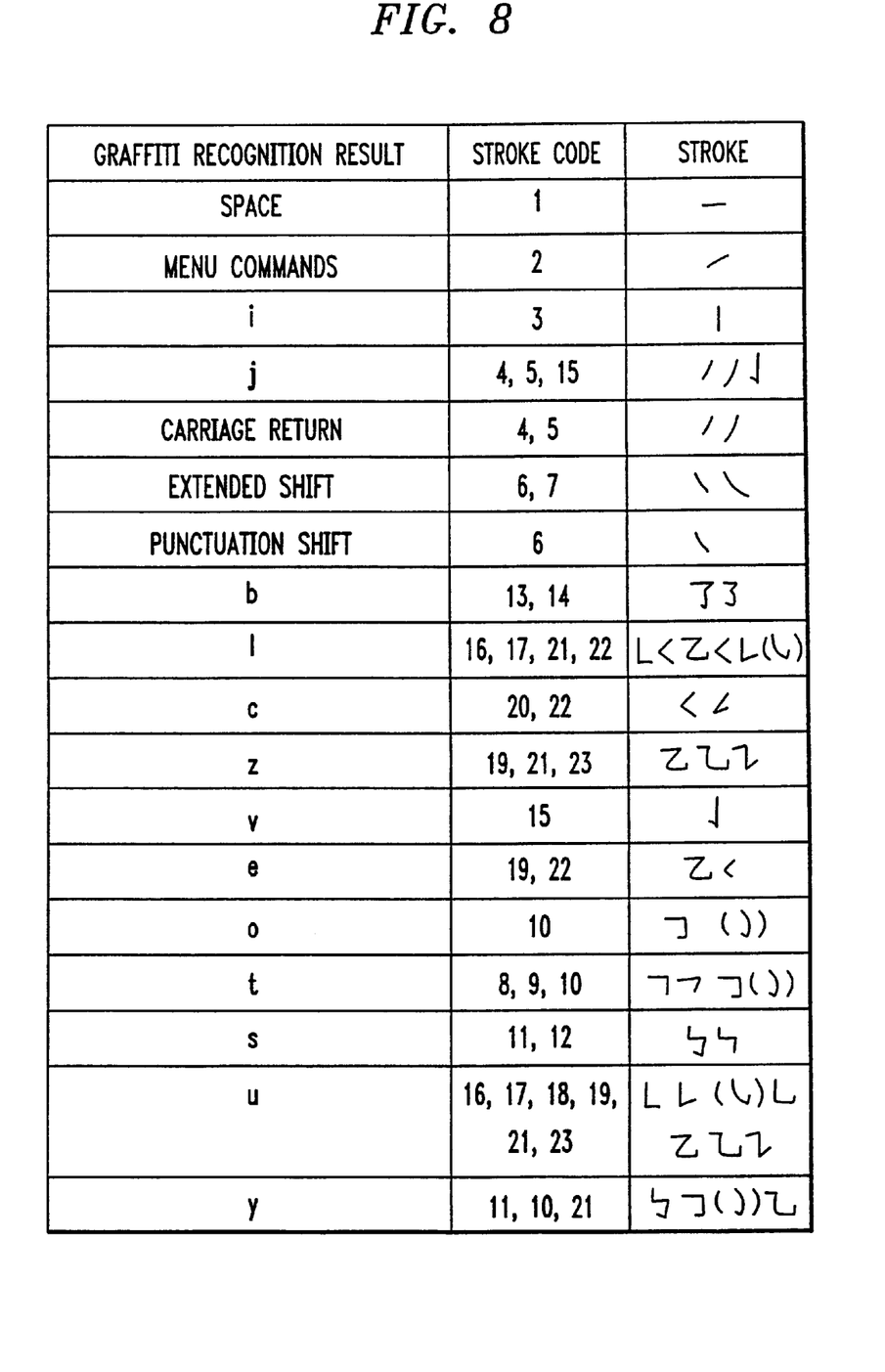
FIG. 8 is the correspondence table between the graffiti alphabets or special symbols and the frequently used Chinese character strokes.

FIG. 8 which is derived from FIG. 7, shows the correspondence table between graffiti recognition results and Chinese character strokes. As shown in FIG. 8, most of the recognition results correspond to more than on Chinese character. Step 52 in FIG. 5 can be carried out by means of the correspondence table shown in FIG. 8.

The correspondence relationship between the graffiti recantation results (i.e. graffiti alphabets and special symbols) and strokes as shown in FIGS. 7 and 8 has been obtained from the statistical data and fits various writing styles of different users. Based on the above correspondence tables and the statistical data, one or more than one dictionary entry can be constructed for each Chinese character and stored into a dictionary in such a way that the entries can be easily retrieved. For example the following dictionary entry may be included in the dictionary for Chinese character "国":

Two-byte GB code: 0x0b9 0x0fa stroke code sequence: 3, 8, 1, 1, 3, 1, 6, 1

As above-mentioned, to fit the writing styles of different users, it is possible to define another stroke sequence of "国" so that another dictionary entry can be included in the dictionary as follows:

Two-byte GB code: 0x0b9 0x0fa stroke code sequence: 3, 8, 1, 3, 1, 1, 6, 1

Figure 9:
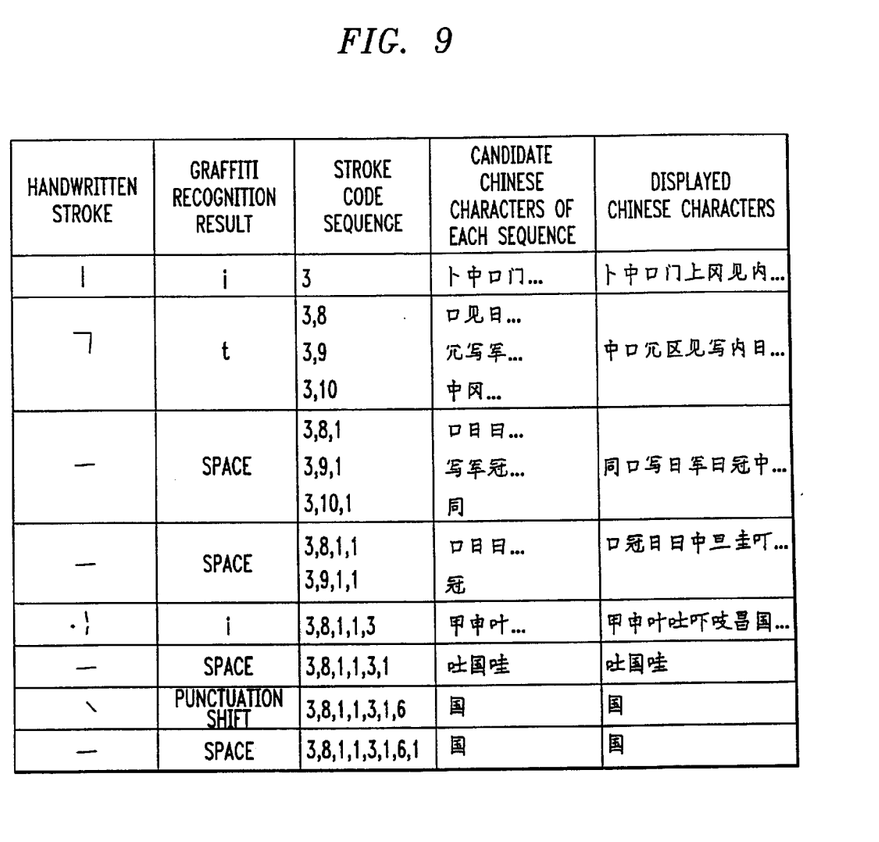
FIG. 9 exemplarily illustrates the working process and displayed results when Chinese characters are input by the methods of the invention.

FIG. 9 shows the working process of the method shown in FIG. 1 and the displayed candidate Chinese characters on the screen when a user handwrites Chinese character "国".

As shown in FIG. 9, the user writes the first stroke-a vertical line stroke, then step 51 (the first step of step 17) recognizes that stroke as graffiti alphabet "i"; step 52 (the second step of step 17) converts graffiti alphabet "i" into stroke code 3; step 12 generates stroke code sequence "3"; step 13 retrieves some candidate Chinese characters "卜中口. . . "; step 14 displays these candidate Chinese characters. As in the displayed Chinese characters there is no Chinese character "国" which is being written by the user, so the judgment result of step 15 is "No" and the process proceeds to step 17.

Then the user writes the second stroke-an upper right corner, step 51 (the first step of step 17) recognizes that stroke as graffiti alphabet "t"; step 52 (the second step of step 17) converts graffiti alphabet "t" into three stroke codes 8, 9 and 10; then step 12 generates three stroke code sequences "3,8", "3,9," and "3,10"; step 13 retrieves three groups of candidate Chinese characters "口见. . . " "冗写. . . " and "中冈. . . " corresponding to these three stroke code sequences; step 14 displays some Chinese characters of these three groups of candidate Chinese characters. As in the displayed Chinese characters there is no Chinese character "国" which is being written by the user, so the judgement result of step 15 is "No" and the process proceeds to step 17.

Similarly, the user goes on writing the third, the fourth stoke, . . . When the user has finished writing the fifth stroke, there appears "国" among the displayed candidate Chinese characters. Therefore the judgement result of step 15 becomes "Yes" and the process proceeds to step 16; the user can input character "国" into the computer by point-touching character "国" displayed on the screen.

There are various retrieving methods in step 13, such as the three retrieving methods described in FIG. 1. Furthermore, the dictionary/lexicon entries can be dynamically modified based on the user's selection results in step 16 in a way similar to that described in FIG. 1.

Alternatively, the user can go on writing the sixth stroke without point-touching character "国" displayed on the screen, leading to displaying of three candidate Chinese characters "吐国哇" on the screen; then the seventh stroke, leading to the displaying of one candidate Chinese character "国" on the screen. Now as a result "国" will be automatically input into the computer. Alternatively the user finishes writing the last stroke, the candidate Chinese character "国" being displayed on the screen, then the user inputs "国" into the computer.

Figure 10:
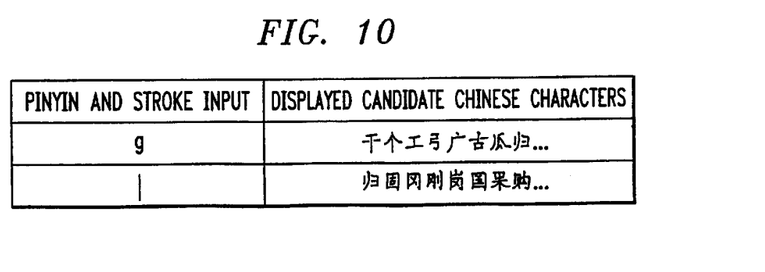
FIG. 10 exemplarily illustrates the working process and displayed results when Chinese characters are input by the methods of the invention.

FIG. 10 shows the working process of the method shown in FIG. 2 and the candidate Chinese characters displayed on the screen when the user is handwriting character "国".

As shown in FIG. 10, the user writes the phonetic tag of "国" first, such as the first alphabet "g" of "guo"; step 20A recognized it as graffiti alphabet "g"; step 20B determines a range in the dictionary and correspondingly displays the Chinese characters in this range on the screen, such as "千个工...". Then the user writes the first stroke—a vertical line, step 51 recognizes the stroke as graffiti alphabet "i"; step 52 converts graffiti alphabet "i" into stroke code 3; step 22 generates stroke code sequence "3"; step 23 retrieves several candidate Chinese characters in the above-mentioned range and step 24 displays these candidate Chinese characters "归国网...". It can be seen from FIG. 10 that character "国" appears on the screen after the user writes only two strokes (one phonetic tag and one stroke). The user can select this character by point-touching character "国" displayed on the screen. Then the judgement result of step 25 becomes "Yes" and step 26 inputs character "国" into the computer.

There are various retrieving methods in step 23, such as the three retrieving methods described in FIG. 2. In addition, the dictionary/lexicon entries can be dynamically modified based on user's selection results in step 26 in a way similar to that described in FIG. 2.

Figure 11A:
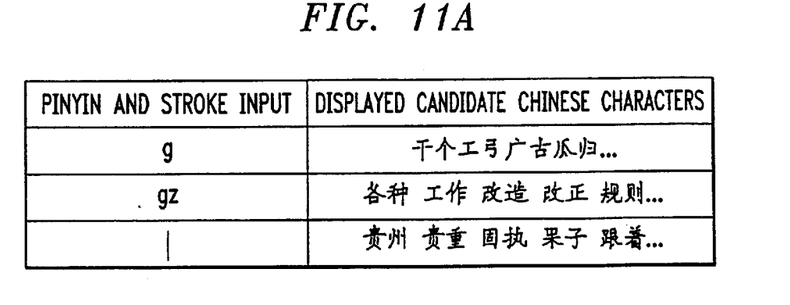
FIGS. 11(A) and 11(B) exemplarily illustrates the working process and displayed results when phrases are input by the methods of the invention.
Figure 11B:
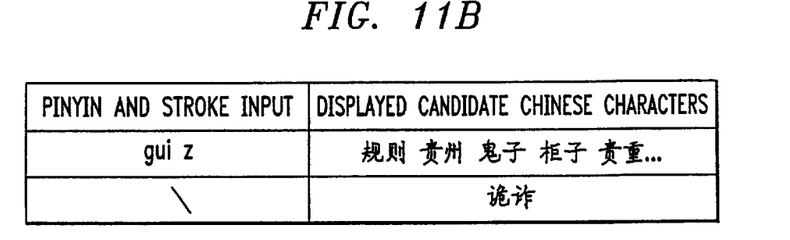

FIGS. 11(A) and (B) show the working process of the method shown in FIG. 2 and the candidate phrases displayed on the screen when the user handwrites Chinese phrases "贵州" and "诡诈".

As shown in FIG. 11(A), when the user writes the phonetic tags of each Chinese character in the phrase "贵州", such as the first alphabet "g" of "gui", step 20A recognizes it as graffiti alphabet "g"; step 20B determines a range in the dictionary so as to display simultaneously relevant Chinese characters in this range "千个工...". When the user goes on writing the phonetic tag of the second character of the phrase, such as the first alphabet "z" of "zhou", step 20B determine a range in the lexicon so as to display simultaneously the relevant phrases "各种工作改造..." in this range. The user goes on writing the first stroke—a vertical line, then step 23 retrieves the candidate phrases "贵州贵重贵重..." and step 24 displays them. Now the user can input this phrase by point-touching displayed "贵州".

As shown in FIG. 11(B), when the user writes the phonetic tags of phrase "诡诈", such as "guiz", step 20B determines a range in the lexicon so as to display simultaneously the candidate phrases "规则鬼子高峰...". The user goes on writing the first stroke-a point, and step 23 retrieves candidate phrase "诡诈" and step 24 displays it. At this time, phrase "诡诈" can be input automatically, or the user can input this phrase by point-touching "诡诈".

Furthermore, assuming that there is no phrase "高峰" in the lexicon, the user can use the first embodiment or the second embodiment to input each character of the phrase and to add this phrase into the lexicon. For example, when the user writes the phonetic tags of phrase "高峰", such as "gf", step 20B is unable to determine a range in the lexicon, thus displaying "No such phrase". The user goes on writing the first stroke, the second stroke . . . of the first character "高" so as to input "高". The user similarly inputs "峰". "高" and "峰" constitute a new phrase "高峰". Then, the phonetic tag "gf", the internal code of "高", the internal code of "峰", the stroke code sequence of "诡诈", the stroke code sequence of "各种" and so on are used to constitute a new lexicon entry, which in turn is added into the lexicon.

In the third embodiment of the invention only a small amount of resources is needed, where displaying of Chinese characters only needs less than 100 KB of the memory space; in the case where 3755 Chinese characters and 3000 phrases are input only less than 125 KB of the memory space is needed. Hence the users can apply the third embodiment to the handhold devices with limited memory and other resources, such as mobile phone, electronic notebook and so on, by writing dedicated stroke recognition software similar to PalmPilot graffiti recognition system.

Figure 12:
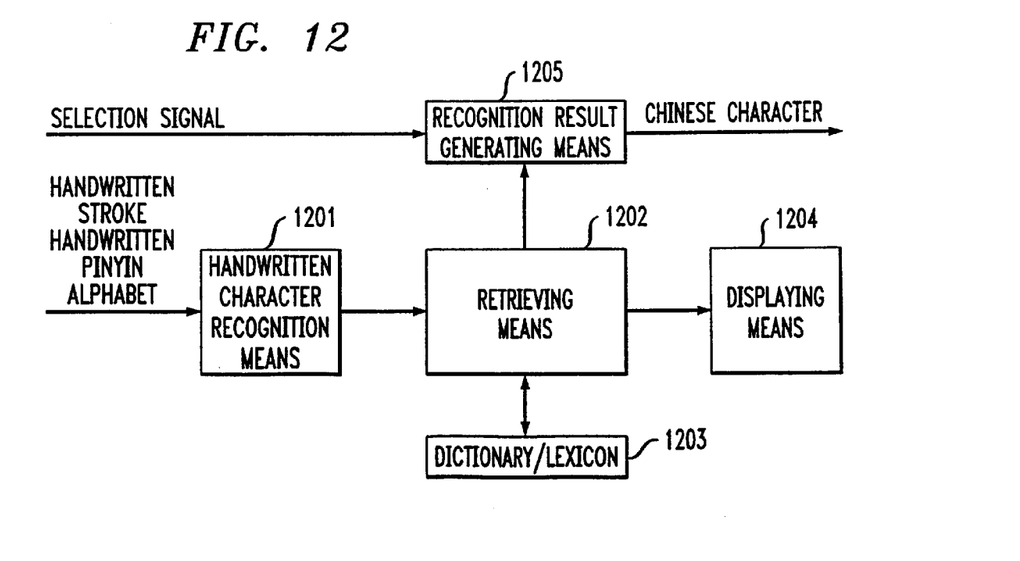
FIG. 12 shows the structural scheme of the apparatus for recognizing handwritten Chinese character based on stroke recognition.

FIG. 12 shows the structural scheme of the stroke-based handwritten Chinese character recognition apparatus of the invention.

In FIG. 12 the means for stroke recognition labelled 1201 detects the pen movement between the pressing down and lifting up of the pen when the user handwrites in strokes Chinese character/phrase, recognizes said one pen movement as at least one stroke code, and forms at least one new stroke code sequence respectively with each one of the at least one stroke code and previously formed stroke code sequence. The means for retrieving labelled 1202 is used to retrieve in the dictionary/lexicon 1203 stored in a computer memory at least one dictionary/lexicon entry which corresponds to above said at least one new stroke code sequence so as to obtain at least one candidate Chinese character/phrase. The means for displaying labelled 1204 is used to dynamically display the above-mentioned at least one candidate Chinese character/phrase. The means for generating recognition results labeled 1205 is used to regard the selected Chinese character/phrase as the recognition result of handwritten Chinese characters/phrases based on user's selection of said displayed at least one candidate Chinese character/phrase.

In the above apparatuses, the stroke recognition apparatus 1201 can also be a phonetic tag recognition apparatus, used to detect the phonetic tags of user handwritten Chinese character/phrase and to determine a range of the dictionary/lexicon entry in dictionary/lexicon 1203 based on the phonetic tag, so that the means for retrieving 1202 can do retrieving in this range.

In another implementation of the above apparatuses the graffiti recognition system in the above PalmPilot computer can be used to implement the partial function of handwritten recognition apparatus 1201. Its implementation process is the same as that described above and not to be repeated.

It should be understood that though the preferred embodiments have been described with reference to the accompanying drawings, various modifications and changes may be made by persons skilled in the art without departing from the spirit and scope of the invention. Hence, the scope of the invention is only defined by the claims.

What is claimed is:

1. A method of recognizing handwritten characters, the method comprising the steps of:

recognizing a current handwritten stroke intended to be associated with at least one character such that at least one stroke code is associated with a recognized stroke to form a current stroke code sequence, the current stroke code sequence including the current stroke code and previously formed related stroke codes, if such related stroke codes were previously formed;

retrieving from a source of characters one or more entries for display which correspond to the current stroke code sequence, the one or more entries representing one or more candidate characters;

displaying the one or more entries retrieved from the source of characters at the completion of each stroke;

repeating the recognition and retrieval steps if a next stroke is received such that the current stroke code sequence is formed from the stroke code associated with this stroke and stroke codes associated with preceding strokes; and generating a recognition result associated with the one or more candidate characters if one or more candidate characters are selected as the intended at least one character.

2. The method of claim 1, wherein the source of characters is at least one dictionary.

3. The method of claim 1, wherein the at least one character includes a set of characters wherein the recognition, retrieval, and generating steps result in identification of one or more candidate sets of characters.

4. The method of claim 3, wherein the source of characters is at least one lexicon.

5. The method of claim 1, further including the step of recognizing a phonetic tag associated with the at least one intended character such that a range within the source of characters is specified and the retrieval step is performed within the range.

6. The method of claim 5, wherein the phonetic tag recognition step is performed prior to the stroke recognition step.

7. The method of claim 5, wherein the phonetic tag corresponds to a first alphabet in a complete phonetic representation of the character.

8. The method of claim 1, wherein the generating step is automatic when the retrieval step results in the identification of one of a single candidate character and a single candidate set of characters.

9. The method of claim 1, wherein the retrieving step includes retrieving each entry in the character source that contains a relevant stroke code sequence which corresponds to the current stroke code sequence.

10. The method of claim 1, wherein the retrieving step includes retrieving each entry in the character source that contains a relevant stroke code sequence which contains the same categories of stroke codes occurring the same amount of times as the current stroke code sequence.

11. The method of claim 1, wherein the retrieving step includes retrieving each entry in the character source that contains a relevant stroke code sequence resulting in a sum of differences between a number of times that respective categories of various stroke codes occur with respect to the relevant stroke code sequence and the current stroke code sequence is at least less than a predetermined threshold.

12. The method of claim 1, further including the step of modifying the source by changing a corresponding stroke code sequence associated with an entry based on the formed stroke code sequence and selection of the one or more candidate characters.

13. The method of claim 1, further comprising the step of modifying the source by adding a new entry containing the formed stroke code sequence to the source based on selection of the one or more candidate characters.

14. The method of claim 1, wherein the recognizing step further includes:

identifying one of the handwritten strokes and phonetic tags with handwritten strokes recognizable to a portable electronic device;

converting the handwritten strokes recognizable to the portable electronic device into one or more stroke codes; and forming the current stroke code sequence from the one or more stroke codes.

15. The method of claim 1, wherein the character is a Chinese character.

16. Apparatus for recognizing handwritten characters, the apparatus comprising:

at least one processor operable to recognize a current handwritten stroke intended to be associated with at least one character such that at least one stroke code is associated with the recognized stroke to form a current stroke code sequence, the current stroke code sequence including the current stroke code and previously formed related stroke codes, if such related stroke codes were previously formed, to retrieve from a source of characters one or more entries for display which correspond to the current stroke code sequence, the one or more entries representing one or more candidate characters, to repeat recognition and retrieval if a next stroke is received such that the current stroke code sequence is formed from the stroke code associated with this stroke and stroke codes associated with preceding strokes, and to generate a recognition result associated with the one or more candidate characters if one or more candidate characters are selected as the intended at least one character;

a display coupled to the at least one processor for displaying the one or more entries retrieved from the source of characters at the completion of each stroke; and memory coupled to the at least one processor for storing at least the character source.

17. The apparatus of claim 16, wherein the source of characters is at least one dictionary.

18. The apparatus of claim 16, wherein the at least one character includes a set of characters wherein the recognition, retrieval, and generation operations result in identification of one or more candidate sets of characters.

19. The apparatus of claim 18, wherein the source of characters is at least one lexicon.

20. The apparatus of claim 16, wherein the at least one processor is further operable to recognize a phonetic tag associated with the at least one intended character such that a range within the source of characters is specified and the retrieval operation is performed within the range.

21. The apparatus of claim 20, wherein the phonetic tag recognition operation is performed prior to the stroke recognition operation.

22. The apparatus of claim 20, wherein the phonetic tag corresponds to a first alphabet in a complete phonetic representation of the character.

23. The apparatus of claim 16, wherein the generation operation is automatic when the retrieval operation results in the identification of one of a single candidate character and a single candidate set of characters.

24. The apparatus of claim 16, wherein the retrieval operation includes retrieving each entry in the character source that contains a relevant stroke code sequence which corresponds to the current stroke code sequence.

25. The apparatus of claim 16, wherein the retrieval operation includes retrieving each entry in the character source that contains a relevant stroke code sequence which contains the same categories of stroke codes occurring the same amount of times as the current stroke code sequence.

26. The apparatus of claim 16, wherein the retrieval operation includes retrieving each entry in the character source that contains a relevant stroke code sequence resulting in a sum of differences between a number of times that respective categories of various stroke codes occur with respect to the relevant stroke code sequence and the current stroke code sequence is at least less than a predetermined threshold.

27. The apparatus of claim 16, wherein the processor is further operable to modify the source by changing a corresponding stroke code sequence associated with an entry based on the formed stroke code sequence and selection of the one or more candidate characters.

28. The apparatus of claim 16, wherein the processor is further operable to modify the source by adding a new entry containing the formed stroke code sequence to the source based on selection of the one or more candidate characters.

29. The apparatus of claim 16, wherein the recognition operation further includes identifying one of the handwritten strokes and phonetic tags with handwritten strokes recognizable to a portable electronic device, converting the handwritten strokes recognizable to the portable electronic device into one or more stroke codes, and forming the current stroke code sequence from the one or more stroke codes.

30. The apparatus of claim 16, wherein the character is a Chinese character.

31. An article of manufacture for recognizing handwritten characters comprising a machine readable medium containing one or more programs which when executed implement the steps of:

recognizing a current handwritten stroke intended to be associated with at least one character such that at least one stroke code is associated with the recognized stroke to form a current stroke code sequence, the current stroke code sequence including the current stroke code and previously formed related stroke codes, if such related stroke codes were previously formed;

retrieving from a source of characters one or more entries for display which correspond to the current stroke code sequence, the one or more entries representing one or more candidate characters;

displaying the one or more entries retrieved from the source from the source of characters at the completion of each stroke;

repeating the recognition and retrieval steps if a next stroke is received such that the current stroke code sequence is formed from the stroke code associated with this stroke and stroke codes associated with preceding strokes; and     generating a recognition result associated with the one or more candidate characters if one or more candidate characters are selected as the intended at least one character.

32. The article of manufacture of claim 31, wherein the character is a Chinese character.

\* \* \* \* \*